Jan. 12, 1960   W. H. JOENS   2,920,930
MULTI-CURVE RECORDER
Filed April 21, 1955   2 Sheets-Sheet 1
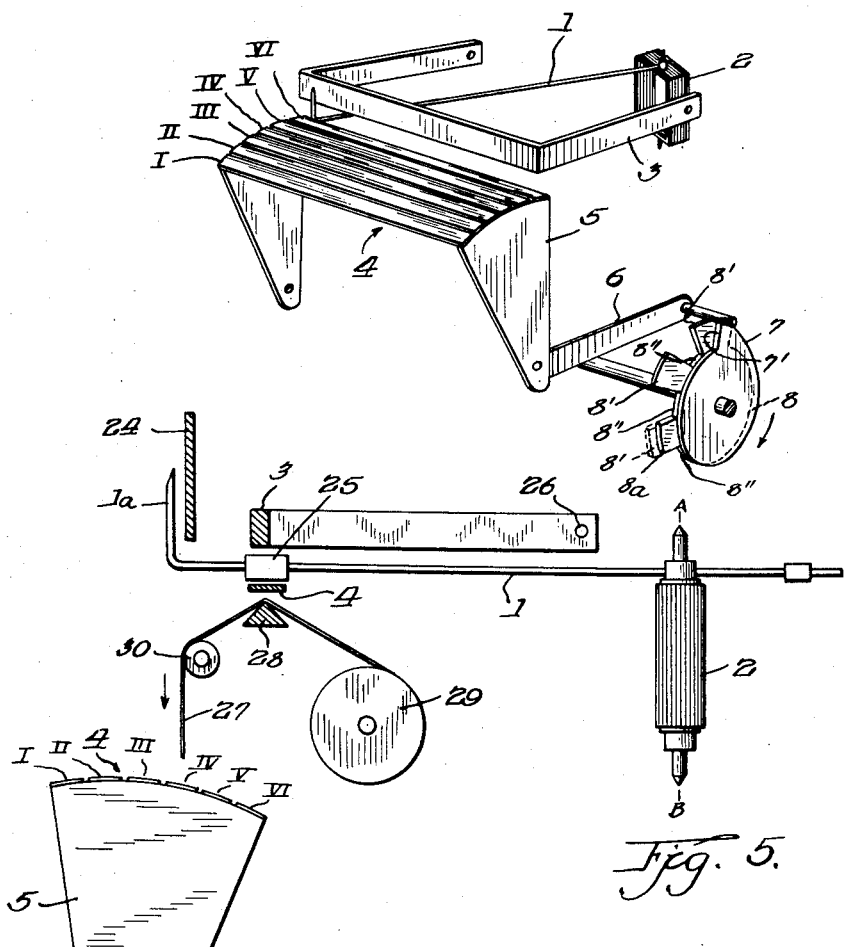
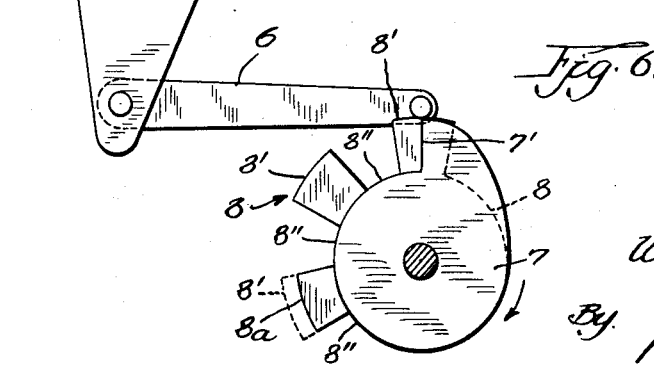
Inventor.
Werner H. Joens.

Jan. 12, 1960 W. H. JOENS 2,920,930
MULTI-CURVE RECORDER
Filed April 21, 1955 2 Sheets-Sheet 2
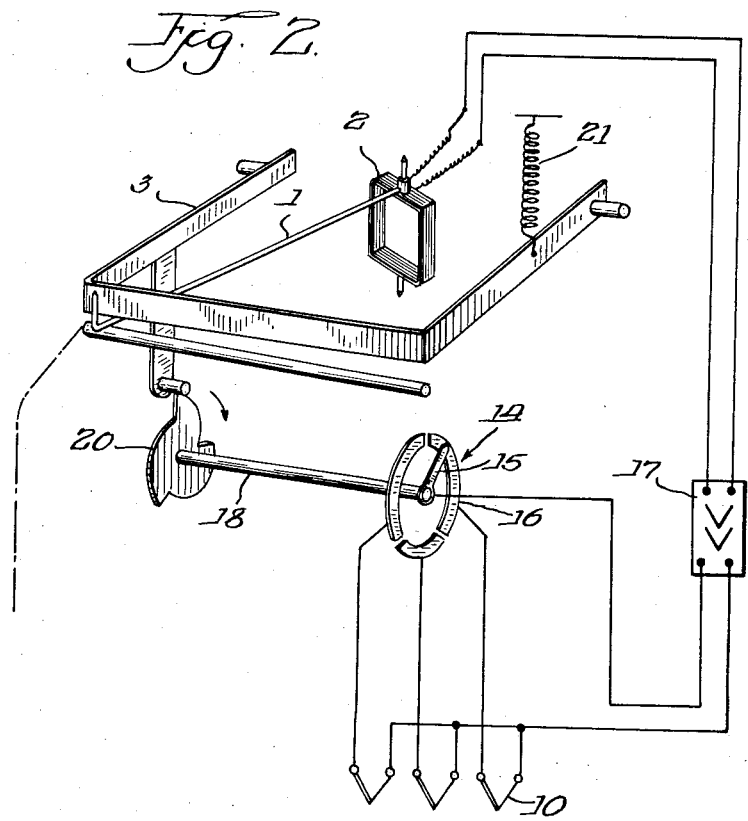
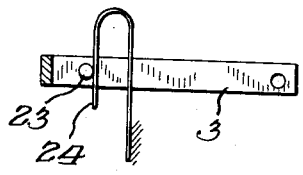
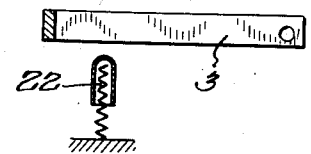
Inventor.
Werner H. Joens.

United States Patent Office 2,920,930
Patented Jan. 12, 1960

2,920,930

MULTI-CURVE RECORDER

Werner H. Joens, Dusseldorf, Germany

Application April 21, 1955, Serial No. 502,976

Claims priority, application Germany April 24, 1954

8 Claims. (Cl. 346—46)

This invention is concerned with a multi-curve recording instrument for recording upon a record strip a plurality of curves each in the form of dots of different colors.

Dot-curve recorders, as it is well known, are used for recording upon a common record strip the measuring values of several sources. The individual sources are for this purpose periodically connected with a measuring device which is operative to cause dot- or pointwise recording of the corresponding measuring values. In this manner are produced curves, one for each source, each curve being formed by dots. In order to distinguish these curves, one from the other, they are formed by dots of different colors. For example, red-colored dots for the curve associated with one source to be measured, green-colored dots for the curve of another source, etc.

Experience has taught that it is practically impossible to use more than six different distinguishing marking colors because finer differentiation that would be required by using more than six colors would not be recognized at any certainty either with daylight or under artificial light. The marking of the curves by different colors is accordingly difficult if there are more than six measuring sources to be recorded.

It has therefore been proposed to mark the curves by coincident printing of small marker numbers or to form recording marks of different shape, for example, circles, crosses, asterisks or the like. Aside from constructional difficulties resulting from the use of such shapes, the possibility of distinguishing between the corresponding curves leaves much to be desired, especially when the curves are closely adjacent.

The invention overcomes these drawbacks by respectively allocating to the various measuring sources different colors and color combinations.

The use of the invention makes it possible to produce curves for many measuring sources by using, for example, only two different colors such as red and green. There may be provided, for example, two curves each having only dots of one color; a curve having green dots interspersed with a few red dots; a curve having red dots interspersed with a few green dots; a curve having a predetermined number of red dots alternating with an identical number of green dots; etc. The use of multi-color curves accordingly gives the possibility to introduce as differentiating criterion the number and sequence of differently colored dots.

The above-explained principle may be realized in several ways by suitable construction of the switching gear for the color carrier. So far as the principle of the invention is concerned, it is generally speaking immaterial how the color carrier is constructed, for example, as an inking ribbon, an inking pad, a color stylus or the like.

Generally speaking, the principle of the invention may moreover be applied independent of the particular imprint member, whether it be an inertia bracket or a printer magnet or other mechanism.

In prior multi-color dot curve recorders in which different curves, each of uniform color, are associated with several measuring sources, the invention may be realized in particularly simple manner, by providing for additional measuring sources dots of identical colors but having therein interspersed a plurality of dots of a predetermined other distinguishing color. This purpose may be realized by only a relatively simple change with respect to the switching device of the color carrier. It is merely necessary to arrest or block the switching of the color carrier periodically so as to insert the desired marker color for the distinguishing dots to be interspersed.

The recorder in which the invention may be used may be provided with a periodically operating mechanism for switching the measuring source to be recorded and for actuating the printer element, for example, an inertia operated printing bracket or lever for switching intervals of less than six seconds, employing at the same time a measuring amplifier with brief actuation interval for the amplification of the currents to be conducted to a direct current measuring instrument. The corresponding multi-curve recorder has accordingly a printing lever or bracket construction and an amplifier ahead of the direct current measuring instrument but is adapted for operating with briefest switching intervals amounting, for example, to one or two seconds.

In such an instrument which may be designated as a "rapid recorder printer," certain drawbacks appear due to the extremely short switching intervals.

A further object and feature of the invention is accordingly, to avoid these drawbacks and to modify the switching mechanism so as to obtain clear recording of the desired measuring values even with briefest switching intervals.

The switching over of the measuring source is effected at the instant when the stylus of the measuring instrument is arrested by the associated printer bracket or lever. The stylus is thereby prevented from executing during the switching operation random oscillations that might occur, especially with two-pole switching and would require a quieting interval so as to assure a position for recording in accordance with the next successive measuring source.

The conditions prevailing in a rapid printer recorder operating with amplifier and accordingly with considerably greater adjusting forces of the measuring instrument, are however different. If the switching over of the measuring source would be in customary manner effected with the stylus arrested, the printer lever would have to be in engagement therewith for a relatively large part of the brief switching interval and the time available in the switching interval for the stroke and drop motion of the printer lever would not suffice for the required undisturbed functioning thereof. The stylus would moreover slide along the printer lever after the switching-over operation, due to the greater force applied thereto for its angular setting, causing with prolonged operation undue wear.

The invention avoids these difficulties by effecting the switching of the measuring source at instants when the printer lever is lifted by the stylus. Due to the increased force applied by the measuring instrument for setting the stylus, such stylus is prevented from executing during the brief switching operation random oscillations but assumes its angular position according to the next successive measuring value practically without oscillation. The printing lever need moreover be very briefly actuated so as to effect the printing of the measuring value; it does not have to rest in engagement with the stylus to arrest it for a prolonged interval. Time is thereby gained during the short switching interval for the stroke and drop of the printer lever.

If a printer lever is in usual manner lifted by a cam and drops by inertia, there will appear the danger of producing oscillations thereof which are with the brief switching intervals extraordinarily disturbing. The printer lever has always the tendency to rebound after it drops, that is, to hit several times in very short sequence. These oscillations affect the clarity of the point or dot printing and also disturb the angular setting motion of the stylus and the operation within the very brief switching intervals.

The invention provides for these reasons special means for preventing the rebound of the printing lever. This may be done in several ways. For example, the operation of the printing lever may be controlled so that it is prior to hitting the stylus caught by a lift cam, its hitting being effected by its kinetic energy by utilizing its own springiness.

The printing lever may also be caught by resilient means so as to cause springy retraction thereof after its hitting when the lift cam begins to lift it, thus preventing random rebound hitting action.

The above-indicated operation may be effected, for example, by causing a spring to engage the printing lever with a short leverage which counteracts the weight of the lever holding it in an intermediate position.

It is essential that the printing lever hits in the corresponding embodiments only once upon each operation thereof and that it is prevented to hit repeatedly by the lift cam engaging it for a lifting operation.

It is also possible to provide for a true damping of the printing lever by placing it along its fall under the control of a brake device, preferably a friction brake.

It will be seen from the foregoing explanations that the dropping printing lever effects the recording or printing of the dots corresponding to the values of the measuring sources to be recorded. The stylus controlled by the measuring instrument, which moves freely with respect to an associated scale is for the dot printing briefly hit by the printing lever to effect the printing by a color carrier, for example, a color ribbon which is pressed thereby against a recording strip. The stylus is thereafter freed again and is adjusted to the next successive measuring value to be recorded. The individual dots thus produced form a curve. The measuring mechanism is automatically switched to the next successive measuring source and the next color carrier associated with such source is advanced for operation. The measured values of the different sources are as previously indicated recorded in differentiating colors so as to secure clear and easily recognizable curves even when the curves lie closely adjacent or in overlapping or crossing relationship.

The production of the printing dots is in a sense comparable with the operations of a typewriter. The moving recording strip may be drawn over a drum of relative small diameter and above such drum is disposed the inking ribbon or ribbons. Slightly spaced from the ribbon is the stylus of the instrument and slightly spaced from the latter is disposed the printing lever which is periodically actuated. The dropping printing lever presses the stylus against the inking ribbon and the latter against the recording strip and the drum of small diameter, thus causing printing of a point or dot upon the recording strip.

The size of the dot will depend on the size of the drum. The shape of the dot is distorted at the beginning and at the end of the width of the recording strip as compared with the central portion thereof. This disadvantage is due to the perpendicular crossing of the stylus and the drum midway of the recording strip, while such crossing extends at the beginning and end of the width of the strip at an acute angle. This angle is the more acute the wider the strip is, and the recordings at the beginning and end of such wide strips are distorted such that inclined strokes are produced instead of dots. There accordingly arise band-shaped curves formed by inclined strokes instead of curves formed by dots. Recordings of this kind are difficult to evaluate if the curves are closely adjacent and frequently in overlapping relationship.

The invention proposes to avoid these disadvantages by the provision of a stationary bar forming an edge coacting with the recording strip.

The recording imprints are even in the case of recording strips of considerable width practically uniformly punctiform at all points along the width thereof. The evaluation of the resulting curves is accordingly always secured.

A further advantage of the invention as compared with known multicolor dot recorders, resides in reducing the wear on the inking ribbons due to the smaller areas occupied by the dots or points produced.

The above indicated and further objects and features of the invention will be brought out in the course of the following description which will be presently rendered with reference to the accompanying diagrammatic drawings.

In these drawings:

Fig. 1 shows in schematic manner the essential parts of the mechanism for switching in different color carriers;

Fig. 2 indicates schematically an embodiment showing particularly the control of the printing lever to prevent undesired rebound thereof;

Figs. 3 and 4 show different embodiments for controlling the operation of the printing lever;

Fig. 5 illustrates schematically details relating to the use of a record support having an edge for producing dots of uniform punctiform shape regardless of the width of the recording strip and Fig. 6 illustrates in a schematic manner the control cam and the blocking or arresting cam of the switching mechanism of Fig. 1.

Referring to Fig. 1, numeral 1 indicates the stylus controlled by a measuring instrument 2. The stylus moves in known manner underneath a printing lever 3 and is thereby periodically pressed downwardly in the direction of a suitable recording strip (not shown). Between the stylus 1 and the recording strip are provided a plurality of ink ribbons generally indicated by numerals 4, for example, six ribbons of different colors I–VI, which are mounted upon a pivotally disposed bracket 5 from which extends an arm 6 having a pin adapted for engagement with a rotatable control cam 7. The latter is suitably coupled with a rotatable switch, not shown in Fig. 1 but diagrammatically indicated in Fig. 2, numeral 14, for switching in the measuring sources the values of which are to be recorded. Such switch may be adapted to switch to the measuring coil 2 successively a plurality of measuring sources, for example, twelve sources. The current from each source causes the coil 2 to move the recording stylus to a different angular position. The printing lever 3 is after each source-switching in known manner actuated and the corresponding value is recorded as a dot or point upon the slowly moving recording strip. The control cam 7 rotates clockwise to move the ribbon carrier 5 angularly so as to dispose for each recording a different ribbon underneath the stylus 1. (Numeral 8 indicates a blocking cam the function of which will presently appear.) Since there are provided six different color ribbons, the control cam 7 will execute one full revolution for six source switchings, whereupon the pin carried by the lever 6 slides off along the edge 7' of the control cam 7, thus returning into its initial position. The operation is thereupon repeated for recording the values of the six remaining sources.

For a more particular description of the multi-curve recorder of my invention, Fig. 1 shows the condition when the cam 7 has just completed its fifteenth revolution ready to start its sixteenth revolution. In connection with this description of operation, the chart with respect to "Revolution of Cam 7" which follows may be considered. The cam 8 was inoperative during the 15 revolutions of cam 7. Incident to the first revolution of cam 7, the first six recordings 1 to 6 had been registered, each in color. During the second revolution of the cam 7, the seventh to twelfth recordings had been similarly registered, that is, recordings 1 and 7 with color I, recordings 2 and 8 with color II, etc., etc. Accordingly, after fourteen revolutions of cam 7, there will result seven registering points for each of the twelve recordings and, particularly, recordings 1 and 7 with color I, recordings 2 and 8 with color II, etc., etc. After the fifteenth revolution of cam 7, the first six recordings 1 to 6 will have received each an additional registering point, that is, each of the recordings 1 to 6 will already have 8 registering points.

Now begins the sixteenth revolution of cam 7 during which the eighth points of the recordings 7 to 12 are registered. Incident to the sixteenth revolution of cam 7, the pin on the control lever 6 cannot slide along the flank 7' since a switching gear (not shown) has placed a tooth such as 8' underneath the pin of the control lever 6. The color carrier 5 is accordingly held by the tooth 8' in a position in which the color VI becomes effective. Accordingly, during the sixteenth revolution of cam 7, all recordings 7 to 12 will be registered in color VI and not in different colors as before. Incident to the seventeenth revolution of cam 7, the recordings 1 to 6 will again be registered. At the start of this seventeenth revolution of cam 7, the switch gear (not shown) switches the cam 8 by one division, thereby placing opposite the pin on the control lever 6 notch 8". The pin accordingly can slide along flank 7', so that the first six recordings 1 to 6 receive, during such seventeenth revolution of cam 7, their ninth registering point in colors I, II, etc., etc., as before. The pin on control lever 6 is thereby lifted by the cam 7, assuming at the end of the seventeenth revolution again its highest position corresponding to the color VI. The cam 8 is now, prior to the start of the eighteenth revolution of cam 7, rotated further, by the switch gear (not shown), thereby placing a second tooth 8' underneath the pin on lever 6, thus holding the color carrier 5 in position corresponding to color VI. The ninth point of the recordings 7 to 12 will accordingly be registered in color VI. During the nineteenth revolution of cam 7, notch 8" is again placed opposite the pin on lever 6, resulting, as during the seventeenth revolution in multi-color registering of the recordings 1 to 6. During the twentieth revolution of cam 7, a third tooth 8' of cam 8 is placed opposite the pin on lever 6, so that the tenth registering point of all recordings 7 to 12 will again appear in the same color.

Accordingly, after twenty revolutions of cam 7, there will result, for the recording 1 ten registering points in color I; for the recording 2 ten registering points in color II, etc. However, for the recording 7, there will be seven registering points in color I and three registering points in color VI; for recording 8, there will be seven registering points in color II and three registering points in color VI, etc. The registerings for the recordings 1 and 7 and 2 and 8 are, accordingly, easily distinguishable.

Only the registering points for the recordings 6 and 12 are similarly in color VI. This shortcoming may if desired be avoided, e.g., by making one of the teeth on cam 8 somewhat shorter as 8a so that the pin on lever 6 can partially slide along the flank of cam 7, placing color V instead of VI in operating position, resulting for the recordings 7 to 12 in the following characteristic registering: recording 8=color VI; 9=color V; 10=color VI. The recordings 6 and 12 are accordingly different.

It will be seen, therefore, that the illustrated structure will produce two-times six differently colored dotted curves of which the curve assigned to the first measuring source and that assigned to the seventh source will have the same color. The dots of the curve of the second measuring source will have the same color as those of the curve assigned to the eighth source, etc.

In order to distinguish between the similarly colored dotted curves, the invention provides means for periodically interspersing into the curves of the seventh to twelfth curves points or dots of a distinguishing color, for example, red dots. It was found advantageous to provide always three dots of the marking color and seven dots of the associated recording color.

In order to obtain this operation, there is provided upon the shaft of the control cam 7 blocking or arresting cam 8 having three teeth 8' and corresponding recesses 8". The base of the notches, such as 8" of the inner cam disk 8 of Fig. 1, has the same radius as the base of the curvature (minimum radius) of the cam disk 7. This blocking cam is stepwise rotated by a suitable switching gear (not shown), for example, by a Maltese cross or the like, and executes one full revolution for each twenty revolutions of the control cam 7. The ribbon carrier 5 is arrested by the teeth 8' in engagement with the pin of the lever 6 so that as long as one of the teeth 8' is in operating position, all recordings in a corresponding dot curve will be in one color, namely, the respectively assigned dominant curve or base color. The foregoing together with the particular description of the operation will be fully understood with reference to the following chart showing alphabetical representations of the different colors recorded in a complete cycle of the device according to the invention, wherein R=red, G=green, B=brown, A=azure, Y=yellow, V=violet.

REVOLUTIONS OF CAM 7

Curves

|      | 1 | 2 | 3 | 4 | 5 | 6 | 7 | 8 | 9 | 10 | 11 | 12 |      |
|------|---|---|---|---|---|---|---|---|---|----|----|----|------|
| 1st  | R | G | B | A | Y | V | R | G | B | A  | Y  | V  | 2nd  |
| 3rd  | R | G | B | A | Y | V | R | G | B | A  | Y  | V  | 4th  |
| 5th  | R | G | B | A | Y | V | R | G | B | A  | Y  | V  | 6th  |
| 7th  | R | G | B | A | Y | V | R | G | B | A  | Y  | V  | 8th  |
| 9th  | R | G | B | A | Y | V | R | G | B | A  | Y  | V  | 10th |
| 11th | R | G | B | A | Y | V | R | G | B | A  | Y  | V  | 12th |
| 13th | R | G | B | A | Y | V | R | G | B | A  | Y  | V  | 14th |
| 15th | R | G | B | A | Y | V | G | G | B | A  | Y  | V  | 16th |
| 17th | R | G | B | A | Y | V | G | R | R | R  | R  | R  | 18th |
| 19th | R | G | B | A | Y | V | G | R | R | R  | R  | R  | 20th |

Accordingly, twenty revolutions of the control cam 7 will provide twelve curves, one curve for each of the twelve measuring sources, and each such curve will have ten recording dots. The measuring values (dots) of the seventh to twelfth measuring source will be recorded three times in identical color and seven times in different colors, while the values of the first to sixth source will be recorded only in uniform base colors, each in one of the six colors of the different inking ribbons.

There would be produced in this manner two curves 6 and 12 of the above chart which could not be distinguished in their marking colors, but this can be prevented, for example, by employing an auxiliary switching operation and consequent change of the marking color as described above.

The color ribbon switching as described with reference to Fig. 1 can of course be incorporated in the structures shown respectively in Figs. 2–4 and 5, but has not been illustrated therein in order to emphasize details relating to other features of the invention.

Referring now to Fig. 2, the recorder shown therein comprises a rotary coil 2 forming part of the direct current measuring instrument. The coil 2 controls the stylus 1 which is adapted to move underneath the printer lever 3. The latter is controlled by a lift cam 20. Numeral 10 indicates thermo elements for transmitting the values of measuring sources to be recorded. These elements 10 are connected with the rotary coil 2 by means of the switching device 14 having a wiper 15 adapted to sweep over segments 16, and an amplifier, for example, a tube compensator 17. The wiper 15 is mounted upon the shaft 18 of the lift control cam 20, the shaft being in suitable known manner (not shown) rotated by a suitable known motor, for example, in such a manner as to switch in one of the measuring sources (elements 10) and to lift the printing lever 3 once every second.

The switching in of the transmitting elements by the rotating wiper 15 is always effected at the instant when the printing lever 3 has been lifted by the cam 20 and has thereby freed the stylus 2. After the source-switching (element 10) has been effected, the printing lever 3 will drop along the radial flank of the corresponding portion of cam 20 and will hit the stylus 2 so as to effect the printing of a corresponding dot.

In order to avoid rebound of the printing lever 3 after hitting the stylus 1 and consequent repeated hitting of the stylus by random oscillations, the cam 20 is arranged for operation in such manner that the printing lever 3 does not drop fully into engagement with the stylus 2 but that it is caught by the rise of cam 20 shortly before contacting the stylus. The kinetic energy imparted to the printing lever 3 causes the lever to deflect resiliently downwardly after it has been caught by the cam so that the lever hits the stylus momentarily to effect the recording of the corresponding dot. Any further oscillation of the lever will be out of engagement with the stylus because of the lifting of the lever by the cam 20.

If it is not desired to utilize the inherent springiness of the printing lever as described above, the action may be effected by forming the lift cam 20 so that the lever 3 can respond to dropping to engage the stylus 2, and providing a spring 21 linked to the lever with short leverage, such spring being effective to balance the weight of the lever so as to hold it in an intermediate position. Due to the kinetic energy of the lever 3, it will drop beyond the intermediate balance position determined by the spring 21, hitting the stylus for recording purposes, but being immediately lifted again by the tension of the spring 21. The printing lever 3 thus operates in the manner of an oscillating system with relatively long oscillation times so that the lifting curve of the cam 20 can advance further to a position in which repeated hitting of the stylus 1 by the lever 3 is avoided.

Instead of using a spring such as 21 in Fig. 2, a resilient stop 22 may be provided, as shown in Fig. 4, for propelling the lever 3 upwardly after it has momentarily hit the stylus 2 so as to give the lift cam time to assume an angular position in which it can catch the lever on its rebound down stroke.

It may be advantageous to employ in some situations both features, namely, the spring 21 and also the resilient stop 22.

A true damping may also be provided for the printing lever 3. As shown in Fig. 3, the printing lever 3 is for this purpose provided with a member 23 which slides during the downward drop of the lever along a spring 24, such spring acting to brake the downward fall of the lever so as to prevent undesired oscillation thereof.

Referring to Fig. 5, numeral 2 indicates the rotary coil of the measuring instrument which is rotatable about the axis A—B. The stylus 1 controlled by the coil 2 is provided with an angular pointer 1a for cooperation with an indicating scale 24. The stylus 1 carries a pressure transmitting member 25 for effecting the printing of the dots responsive to dropping of the printing lever 3 pivoted at 26 and consequently hitting of the stylus 1, thereby causing the pressure transmitting member 25 to hit the inking ribbon 4 to displace it momentarily into pressure engagement with the record strip 27 moving over the stationary bar 28 forming a dot printing edge as shown. The record strip 27 is by suitable means moved from a storage drum 29 over the angular printing support 28 and an idler roller 30 thus always securing engagement of the record strip 27 with the edge of the printing support 28. The printing lever 3 which is pivoted at 26 is periodically lifted and caused to drop as described before. There may be provided a desired plurality of colored inking ribbons as described in connection with Fig. 1.

Changes may be made within the scope and spirit of the appended claims.

I claim:

1. In a multi-color dot curve recorder having means for moving a record strip past a printing support and a stylus disposed normally spaced from said record strip and having an instrument for laterally positioning said stylus relative thereto in accordance with values of measuring sources to be recorded and having multi-color inking means interposed between said stylus and said record strip and a pivotally mounted printing lever and means for periodically moving it relative to said stylus, whereby a dot is produced on said record strip responsive to each operation of said printing lever, the position of said dot corresponding to the lateral position of said stylus in accordance with the positioning thereof by said instrument; a device for distinctively marking the curve formed by the dots of a predetermined measuring source, said device comprising a pivotally mounted carrier for supporting said multi-color inking means, an arm extending from said carrier, a rotatable control cam for successively moving said arm and therewith said carrier and said multi-color inking means to dispose relative to said stylus different base colors respectively assigned to the different dot curves to be recorded, and means including a rotatable blocking cam cooperating with said arm of said carrier for periodically stopping said inking means to intersperse dots of different color between dots of a base color assigned to a predetermined curve, said blocking cam having blocking portions and non-blocking portions and being held stationary with a non-blocking portion disposed relative to said carrier arm to permit motion of said multi-color inking means by said control cam as specified, for a predetermined number of cyclic revolutions of said control cam, said blocking cam thereupon rotating to place a blocking portion thereof relative to said carrier arm for blocking the motion of said multi-color inking means by said control cam, for a predetermined number of further cyclic revolutions of said control cam, said blocking cam thereafter again rotating to place a non-blocking portion thereof relative to said carrier arm to again permit motion of said multi-color inking means by said control cam.

2. A recorder according to claim 1, wherein said inking means comprises a plurality of different color ribbons, switching means for selectively switching to said instrument measuring sources the values of which are are to be recorded, said control cam operating synchronously with said switching means for adjusting said carrier to dispose said color ribbons correspondingly selectively so as to assign colors in predetermined sequence to correspondingly switched in measuring sources.

3. A recorder according to claim 1, wherein said instrument is a direct current measuring instrument for angularly positioning said stylus, an amplifier, and switching means periodically operable for intervals of less than six seconds for respectively effecting disengagement of said printing lever from said stylus and for connecting the respective measuring sources over said amplifier with said measuring instrument to cause setting of said stylus in accordance with the respective values of said sources while said printing lever is disengaged from said stylus.

4. A recorder according to claim 3, comprising further cam means for lifting said printing lever relative to said stylus, said printing lever subsequently dropping by inertia, said further cam means being operative to catch said dropping printing lever shortly before said printing lever hits said stylus, the kinetic energy of such printing lever causing further resilient travel thereof to hit said stylus so as to displace it for the purpose of effecting printing of a dot in accordance with the setting of said stylus.

5. A recorder according to claim 3, comprising further cam means for lifting said printing lever out of engagement with said stylus, said printing lever subsequently dropping by inertia to hit said stylus so as to effect printing of a dot in accordance with the setting of said printing lever, and resilient means for elastically braking the fall of said printing lever after hitting said stylus to cause said printing lever to rebound, said further cam means being meanwhile angularly displaced to catch said printing lever upon dropping from said rebound for lifting such lever for subsequent dropping thereof.

6. A recorder according to claim 5, comprising resilient stop means for said printing lever constituting said resilient means.

7. A recorder according to claim 5, wherein said resilient means is a spring anchored to said printing lever at a point of short leverage, said spring counteracting the weight of said printing lever and its force being such as to hold such printing lever in balance in an intermediate position thereof.

8. A recorder according to claim 3, comprising further cam means for lifting said printing lever out of engagement with said stylus, said printing lever subsequently dropping by inertia to hit said stylus so as to effect printing of a dot in accordance with the setting of said printing lever, and a device for braking the fall of said printing lever so as to prevent undesired rebound thereof.

References Cited in the file of this patent

UNITED STATES PATENTS

| | | |
|---|---|---|
| 1,090,749 | Payne | Mar. 17, 1914 |
| 1,564,558 | Grisdale | Dec. 8, 1925 |
| 1,820,088 | Parker et al. | Aug. 25, 1931 |
| 2,674,513 | Bowditch et al. | Apr. 6, 1954 |
| 2,674,514 | Franz | Apr. 6, 1954 |

FOREIGN PATENTS

| | | |
|---|---|---|
| 70,462 | Switzerland | Mar. 2, 1914 |
| 56,658 | Netherlands | July 15, 1944 |